Figure 3:
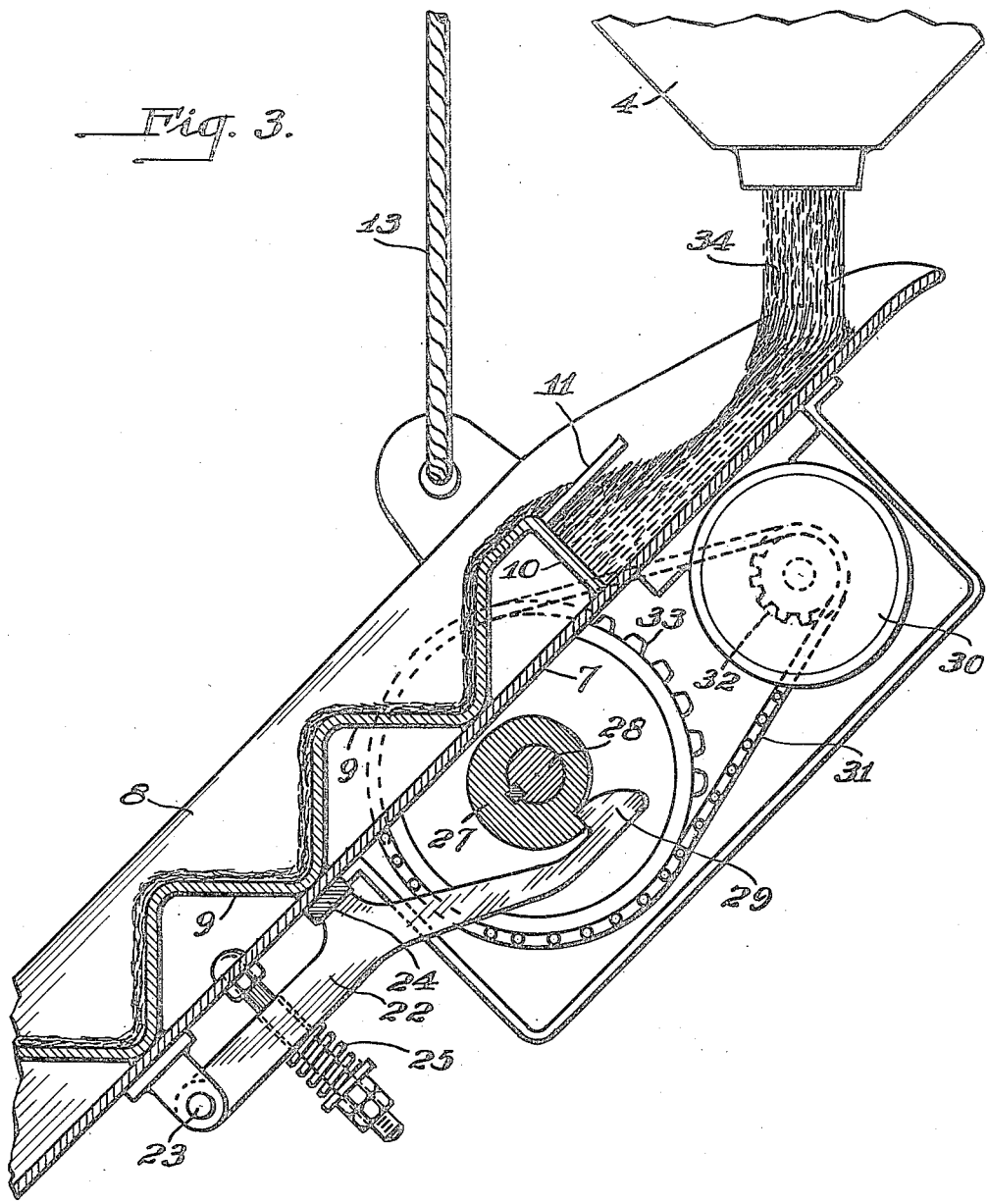

Nov. 1, 1932.                L. SHOWERS                1,885,774
                        CLAY POURING APPARATUS
                        Filed Nov. 2, 1928            2 Sheets-Sheet 1
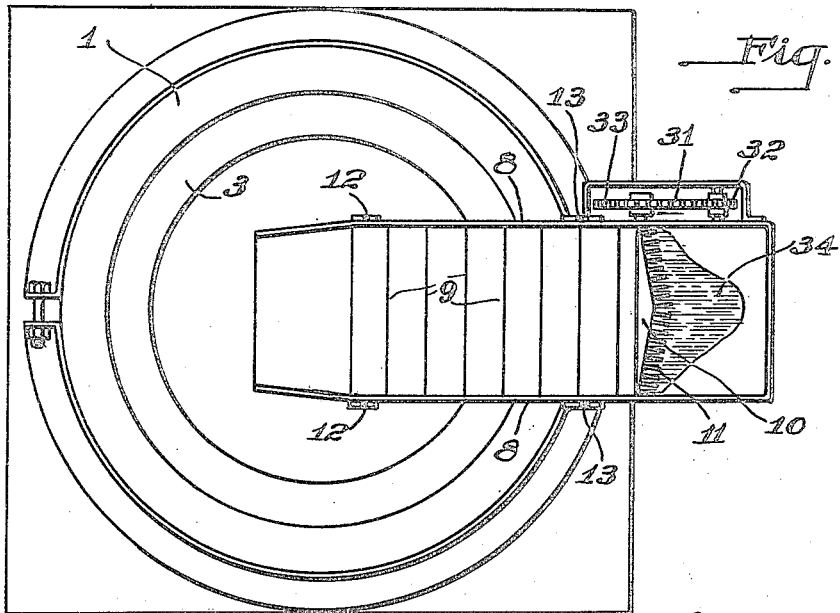
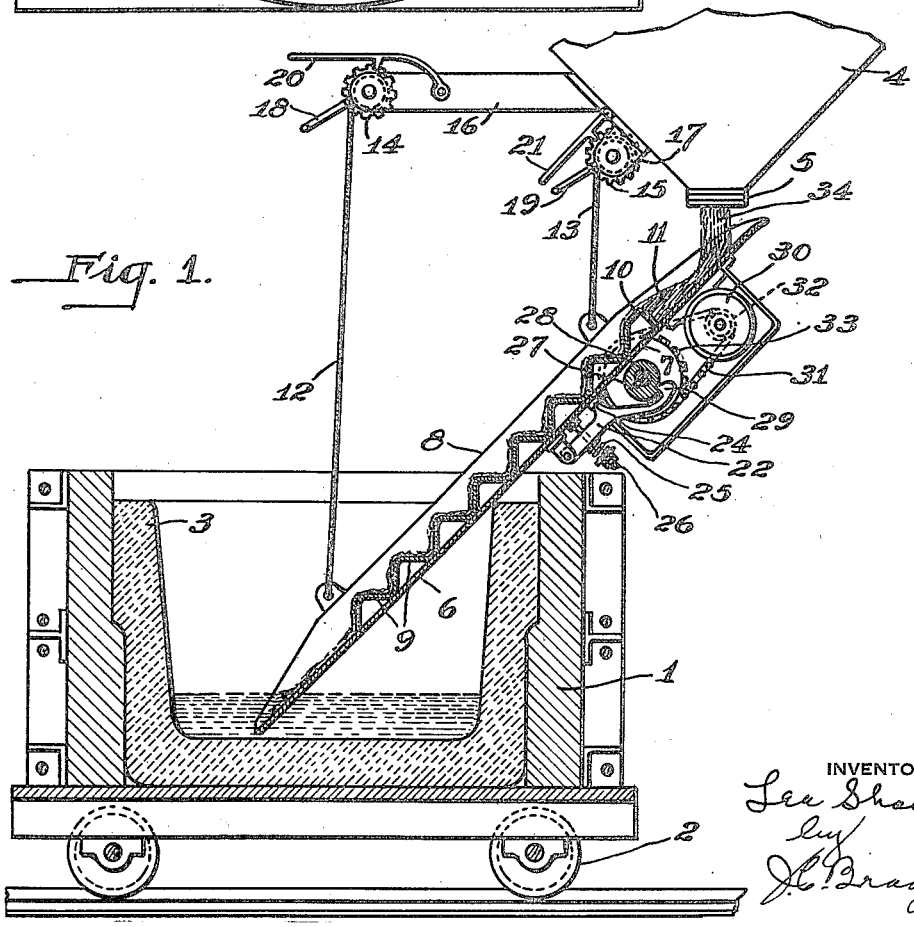
INVENTOR
Lee Showers Nov. 1, 1932.  L. SHOWERS  1,885,774
CLAY POURING APPARATUS
Filed Nov. 2, 1928  2 Sheets-Sheet 2

INVENTOR
Lee Showers
by
James Bradley
atty

Patented Nov. 1, 1932

1,885,774

UNITED STATES PATENT OFFICE

LEE SHOWERS, OF CHARLEROI, PENNSYLVANIA, ASSIGNOR TO PITTSBURGH PLATE GLASS COMPANY, A CORPORATION OF PENNSYLVANIA

CLAY POURING APPARATUS

Application filed November 2, 1928. Serial No. 316,714.

The invention relates to apparatus for making poured clay articles and particularly to the means for freeing the clay from air bubbles which would otherwise cause defects and voids in the articles. The invention finds its greatest field in the manufacture of pots for use in the melting of glass, but is not limited to clay articles of this particular kind, as it is equally useful in the forming of tank blocks or other clay objects which are produced by a pouring operation. The invention has for its principal object the provision of improved means which can be conveniently interposed between the mixer and the mold and which will eliminate all the larger air bubbles present in the mix and a large part of the small ones, the important thing being the elimination of the relatively large bubbles which would cause harmful voids in the poured article, if left in the mix. One embodiment of the invention is shown in the accompanying drawings, wherein:

Figure 1 is a partial side elevation and partial section through the apparatus. Fig. 2 is a plan view of the apparatus just below the mixer. And Fig. 3 is a partial vertical section on an enlarged scale through the trough.

Referring to the drawings, 1 is a pot mold carried upon the truck 2, and 3 is the outer shell of a pot which has already been cast and which is to be provided with a lining of clay which is ground finer than the clay in the outer shell 3, this being in accordance with the practice set forth in my application, Serial No. 230,817 which has become Patent 1,-754,838. Mounted above the mold is a mixer 4, which may be of any suitable construction for thoroughly mixing the clay and water, which is to form the mix, such mixer having a suitable valve or gate 5 at its lower end for governing the flow of the mix.

Supported below the mixer in position to receive the mix, and conduct it to the mold is a trough or riffle board 6 to which the invention particularly relates. This trough comprises the bottom 7 and side members 8, 8 of sheet metal provided with the series of steps 9, 9, 9, etc., also of sheet metal. At the upper end of the trough is a spreading shelf 10 provided at its upper edge with a series of pins 11. The trough is supported by a pair of cables 12 and 13 passing around drums 14 and 15 carried upon brackets 16 and 17. These drums are provided with cranks 18 and 19 and dogs 20 and 21 engaging suitable ratchets carried by the drums. By this means the trough may be raised and lowered to any desired position of adjustment.

Also carried by the trough, on the lower side thereof, is a hammer or tapping bar 22 pivoted at 23 and adapted to strike the transverse bar 24 on the bottom of the trough. This bar 22 is moved upward by the spring 25 surrounding the guide rod 26. The bar is operated by a cam 27 carried by the shaft 28 mounted in bearings on the lower side of the trough, the bar 22 being provided with a nose 29 which rides on the cam. The shaft 28 is driven from an electric motor 30 by means of a chain 31, which passes around the sprocket 32 on the motor shaft and the sprocket 33 on the shaft 28. By this arrangement, the rotation of the shaft causes the bar 22 to move in and out striking the bar 24 a series of blows and promoting the separation from the clay mix flowing through the trough of any air entrapped therein.

In operation the clay mix flows down into the upper end of the trough in the stream 34 (Fig. 3), spreading out as it reaches the shelf 10 and flowing upward between the pins 11, which act as a screen, and catch any masses of clay, which are not sufficiently divided. Any masses of clay or other hard bodies, which do not break up at this point, may be removed from time to time by hand. The clay mix then passes over the steps 9, 9, 9, etc., in a thin layer and during this passage, any air bubbles in the mix are exposed and escape. This action of escape is greatest where the mix passes around the corners of the steps due to the stretching of the layer of mix. By the time the mix reaches the shell 3, which acts as a mold, it is freed from all the large bodies of air which would tend to form injurious voids in the finished pot. As above indicated, the vibration of the trough by the hammer 22 also promotes the separation of air from the mix. After the necessary body of clay mix is deposited in the shell 3, the trough is removed and a plunger is pressed into the mix, shaping it so that it forms a lining to the shell, the plunger remaining in place until the mix has set or hardened in place. The same procedure is employed in forming the shell 3, and the improved trough may be used to advantage in supplying a clay mix to any form of mold, the function achieved being the freeing of the clay mix from entrapped bodies of air formed in mixing, thus giving an article of uniform, relatively dense composition, free from voids.

What I claim is:

1. The combination with an apparatus for mixing clay and water having an outlet, of an inclined member in position to receive the discharge from said outlet and which in turn discharges to a mold, such member being provided with a series of steps over which the clay mix flows on its way to the mold.

2. The combination with an apparatus for mixing clay and water having an outlet, of an inclined trough in position to receive the discharge from said outlet and which in turn discharges to a mold, such trough having on its bottom a series of steps over which the clay mix flows on its way to the mold.

3. The combination with an apparatus for mixing clay and water having an outlet, of an inclined member in position to receive the discharge from said outlet and which in turn discharges to a mold, such member being provided with a series of steps over which the clay mix flows on its way to the mold, and means for agitating the member.

4. The combination with an apparatus for mixing clay and water having an outlet, of an inclined member in position to receive the discharge from said outlet and which in turn discharges to a mold, such member being provided with a series of steps over which the clay mix flows on its way to the mold, and a power operated device carried by said member for causing it to vibrate.

5. The combination with an apparatus for mixing clay and water having an outlet, of an inclined member in position to receive the discharge from said outlet and which in turn discharges to a mold, such member being provided with a series of steps over which the clay mix flows on its way to the mold, and a screening device at the upper end of such member for catching masses of clay not sufficiently divided.

6. The combination with an apparatus for mixing clay and water having an outlet, of an inclined trough in position to receive the discharge from said outlet and which in turn discharges to a mold, a shelf in the trough at the upper end thereof extending up from its bottom at substantially right angles thereto, a row of pins extending out from the upper edge of the shelf at substantially right angles thereto, and a series of steps on the bottom of the trough below said shelf.

7. The combination with an apparatus for mixing clay and water having an outlet, of an inclined trough in position to receive the discharge from said outlet and which in turn discharges to a mold, a spreading shelf at the upper end of the trough at right angles to the bottom of the trough, and a series of steps on the bottom of the trough below said shelf.

8. The combination with an apparatus for mixing clay and water having an outlet, of an inclined member in position to receive the discharge from said outlet and which in turn discharges to a mold, such member being provided with a series of steps over which the clay mix flows on its way to the mold, a hammer mounted for oscillation on said member, and power means for operating the hammer.

In testimony whereof, I have hereunto subscribed my name this 11th day of October, 1928.

LEE SHOWERS.